(12) United States Patent
Kuroda

(10) Patent No.: US 7,021,615 B2
(45) Date of Patent: Apr. 4, 2006

(54) CLAMP DEVICE

(75) Inventor: Takayuki Kuroda, Itami (JP)

(73) Assignee: Pascal Engineering Corporation, Hyogo (JP)

( * ) Notice: Subject to any disclaimer, the term of this patent is extended or adjusted under 35 U.S.C. 154(b) by 58 days.

(21) Appl. No.: 10/489,144

(22) PCT Filed: Sep. 6, 2002

(86) PCT No.: PCT/JP02/09101

§ 371 (c)(1),
(2), (4) Date: Apr. 1, 2004

(87) PCT Pub. No.: WO03/027511

PCT Pub. Date: Apr. 3, 2003

(65) Prior Publication Data

US 2004/0207141 A1 Oct. 21, 2004

(30) Foreign Application Priority Data

Sep. 21, 2001 (JP) .............................. 2001-288745

(51) Int. Cl.
*B23Q 3/00* (2006.01)

(52) U.S. Cl. ..................................................... 269/309

(58) Field of Classification Search ........ 269/309–310, 269/48.1, 234; 198/345; 228/49.3
See application file for complete search history.

(56) References Cited

U.S. PATENT DOCUMENTS 6,527,266 B1 * 3/2003 Yonezawa et al. .......... 269/309

* cited by examiner

*Primary Examiner*—Robert C. Watson
(74) *Attorney, Agent, or Firm*—Jordan and Hamburg LLP

(57) ABSTRACT

A clamp device is disclosed which maintains a stable clamped state, even if an object to be fixed, being a work pallet or die, is clamped in a repeated fashion, and which is compact in size and yet capable of clamping the object to be fixed with a large clamping force. In this clamp device (3), a plurality of partial sphere-shaped engaging recess sections (21) are formed in a bush (10), and the clamping mechanism (11) comprises a holding body (23) having a tubular holding section (23b), a plurality of steel balls (24) held movably in the radial direction in the holding section (23b) so as fact to the plurality of engaging recess sections (21), and a piston member (25) inserted movably into an axle hole (28) in the holding section (23b), whereby the plurality of steel balls (24) can be made to engage respectively with the plurality of engaging recess sections (21) by the clamp operating means (12) causing the piston member (25) to move in the axial direction thereof, and the plurality of steel balls (24) can be made to retreat from the engaging recess sections (21) by clamp releasing means (13) causing the piston member (25) to move in the axial direction thereof.

7 Claims, 6 Drawing Sheets

CLAMP DEVICE

TECHNICAL FIELD

The present invention relates to a clamp device, and more particularly, to a clamp device capable of maintaining a stable clamped state, even when a work pallet or die is used repeatedly.

BACKGROUND ART

Conventionally, clamp devices of various types are used in order to fix a work pallet or die to a base member provided on a table, or the like, of a machine tool. For example, the present applicants have developed the following kind of clamp device into practical use.

In this clamp device, a cylindrical holding section is formed in the upper half portion of the clamp main body, and a plurality of steel balls are held in a movable fashion in the radial direction, in this holding section. A piston member forming an output member for outputting a clamping force and a clamp releasing force is inserted movably into this holding section. This piston member is urged downwards by disc springs, for example, and when clamping is released, it is driven upwards by a hydraulic cylinder. A plurality of inclined sections for pressing the plurality of steel balls in an outward direction are provided in the upper end section of the piston member, and a plurality of recess sections into which the plurality of steel balls can retreat are provided respectively in the lower side of each inclined section. On the other hand, a ring-shaped bush is fixed to the work pallet, and a ring-shaped tapered face capable of engaging with the plurality of steel balls is formed on the upper end side portion of the bush.

When the clamping action is released, the piston member is pushed upwards by the hydraulic cylinder, against the elastic urging force of the disc spring. From this state, if the hydraulic pressure in the hydraulic cylinder is discharged, then the piston member will be driven downwards by the elastic urging force of the disc spring, and in association with this, the plurality of steel balls will be pushed outwards in a radial direction, by means of the plurality of inclined sections. The outer portion of each steel ball engages with the ring-shaped tapered face, and a clamping force is transmitted to the bush, whereby the work pallet becomes clamped.

From this clamped state, if hydraulic pressure is supplied to the hydraulic cylinder, then the piston member will be driven upwards by the hydraulic cylinder, and in association with this, the steel balls will retreat respectively towards the inner side, and the inner section of each steel ball will become accommodated inside a recess section, whereby the engagement between the steel balls and the ring-shaped tapered face is released and the fixing of the work pallet is released.

Next, the problems to be solved by the present invention will be described.

In the clamp device described above, a work pallet is clamped by means of a plurality of steel balls engaging with the ring-shaped tapered face of the bush, but since the contact surface area between the respective steel balls and the ring-shaped tapered face is small, the clamping force acts in a localized fashion in the ring-shaped tapered face. Therefore, in particular, when the clamping force is large, the steel balls leave contact marks on ring-shaped tapered face, and as the work pallet is used repeatedly, the clamping force starts to act unevenly on the ring-shaped tapered face, and there is a risk that it will become difficult to maintain a stable clamped state.

Although it is possible to avoid leaving the contact marks due to the steel balls by reducing the force acting locally on the ring-shaped tapered face, in order to increase the contact surface area between the steel balls and the ring-shaped tapered face, the steel balls must be made larger in size, or the number of steel balls must be increased, and hence the clamp device will become larger in size, and disadvantages in manufacturing costs will be incurred.

It is an object of the present invention to provide a clamp device whereby a stable clamped state can be maintained, even if a work pallet or die is used repeatedly, and to provide a clamp device which is compact in size and capable of clamping a work pallet or die by a large clamping force. Further objects of the present invention will become apparent from the description of the advantages of the invention and the description of the embodiments.

DISCLOSURE OF THE INVENTION

The clamp device according to the present invention is a clamp device for fixing, to a base body, an object to be fixed such as a work pallet for installing a workpiece to be machined, or a die, the clamp device comprising: a ring-shaped bush fixed to the object to be fixed and provided with a plurality of partial sphere-shaped engaging recess sections disposed in a ring shape; a clamp mechanism comprising a holding body having a tubular holding section capable of being inserted into the bush, a plurality of steel balls held movably in the radial direction in the holding section so as to fact to the plurality of engaging recess sections, and a clamp output member inserted movably into an axle hole of the holding section, the plurality of steel balls being capable of engaging respectively with the plurality of engaging recess sections; clamp operating means for moving the clamp output member in the direction of the center axis thereof, thereby causing the plurality of steel balls to engage respectively with the plurality of engaging recess sections; and clamp releasing means for moving the clamp output member in the direction of the center axis thereof, thereby allowing the plurality of steel balls to retreat from the plurality of engaging recess sections.

In this clamp device, a workpiece to be machined is installed on a work pallet which forms the object to be fixed, whereupon the work pallet is conveyed to a machine tool and is set onto a base body fixed to the table of the machine tool, or onto a base body formed by the actual table of the machine tool. From this state, the clamp output member is caused to move in the axial direction by the clamp operating means, thereby causing the plurality of steel balls to move in radial directions inside the holding sections, and hence causing the plurality of steel balls to engage respectively with the plurality of engaging recess sections, whereby the work pallet becomes fixed to the base body. Here, since the plurality of steel balls engage respectively with the plurality of engaging recess sections, thereby transmitting the clamping force to the bush, the contact surface area between the bush and the steel balls is relatively large, and hence the steel balls do not leave contact marks on the bush and a stable clamped state can be maintained.

From this clamped state, if the clamp output member is moved in the axial direction, this being the opposite direction to that traveled when moving to the clamped state, by means of the clamp releasing means, then the plurality of steel balls will be caused to move inside the holding section in the opposite direction to that traveled when moving to the clamped state, and hence the plurality of steel balls are retreated from the plurality of engaging recess sections and the fixing of the work pallet is released. The action in the case of fixing a die by means of the clamping device is similar to that in the case of fixing a work pallet, and hence description thereof is omitted here.

According to the present invention, since an object to be fixed being a work pallet or a die can be clamped by causing a plurality of steel balls to engage respectively with a plurality of engaging recess sections, then the contact surface area between the bush and the steel balls becomes relatively large, and hence the steel balls do not leave contact marks on the bush, and there is no change in the position of engagement between the steel balls and the bush, even after repeated clamping of the object to be fixed, which means that the clamping force always acts evenly on the bush and a stable clamped state can be maintained at all times. Moreover, even if a large clamping force is required, since the contact surface area between the steel balls and the bush is relatively large, there is no need to increase the size of the steel balls or to increase the number of steel balls, in order to increase this contact surface area, and hence the clamp device can be made compact in size.

Next, preferable modes regarding the constitution of the present invention are described.

a) The clamp operating means has a plurality of inclined sections formed in the clamp output member and inclined at a given angle with respect to the direction of the center axis, these inclined sections causing the plurality of steel balls respectively to move outwards in a radial direction. When moving to the clamped state, if the clamp output member is moved in the axial direction, then the plurality of inclined sections formed on the clamp output member respectively abut against the plurality of steel balls, and with the movement of the clamp output member, the plurality of inclined sections also move in the axial direction, thus causing the plurality of steel balls respectively to move outwards in a radial direction. The plurality of steel balls that have moved outwards in a radial direction engage respectively with the plurality of engaging recess sections formed in the bush, thereby fixing the object to be fixed, to the base body.

Therefore, when moving to the clamped state, the clamp output member is moved in the axial direction, thus causing the plurality of inclined sections formed on the clamp output member to abut respectively against the plurality of steel balls, and the plurality of steel balls are respectively caused to move outwards in a radial direction by the plurality of inclined sections, whereby the plurality of steel balls can be caused to engage respectively with the plurality of engaging recess sections.

b) The clamp releasing means comprises a plurality of hemispherically-shaped recess sections formed in the clamp output member respectively adjacent to the inclined sections, the plurality of recess sections allowing the plurality of steel balls respectively to retreat inwards in a radial direction. When moving from the clamped state to the unclamped state, if the clamp output member is moved in the axial direction in the opposite direction to that traveled when moving to the clamped state, then the inclined sections also travel in the same direction due to the movement of the clamp output member, and hence the plurality of steel balls, that were pushed outwards in radial directions by the inclined sections, move back inwards and retreat respectively into the plurality of recess sections formed adjacently to the inclined sections. Therefore, the fixing of the object to be fixed is released by means of retreating the steel balls from the engaging recess sections.

Consequently, when moving from a clamped state to an unclamped state, by causing the inclined sections to move in the same direction as the clamp output member due to the movement of the clamp output member, the plurality of steel balls are caused to move inwards and retreat respectively into the plurality of recess sections formed adjacently to the inclined sections, and hence the plurality of steel balls are separated respectively from the plurality of engaging recess sections and the fixing of the object to be fixed is released.

c) The clamp operating means comprises a ring-shaped tapered face formed in the clamp output member, the ring-shaped tapered face causing the plurality of steel balls to move outwards in a radial direction.

When moving to the clamped state, if the clamp output member is moved in the axial direction, then the ring-shaped tapered face formed on the clamp output member abuts respectively against the plurality of steel balls, and with the movement of the clamp output member, the ring-shaped tapered face also moves in the axial direction, thus causing the plurality of steel balls respectively to move outwards in a radial direction. The plurality of steel balls that have moved outwards in a radial direction engage respectively with the plurality of engaging recess sections formed in the bush, thereby fixing the object to be fixed, to the base body.

Therefore, when moving to the clamped state, the clamp output member is moved in the axial direction, thus causing the ring-shaped tapered face formed on the clamp output member to abut respectively against the plurality of steel balls, and the plurality of steel balls are respectively caused to move outwards in a radial direction by the ring-shaped tapered face, whereby the plurality of steel balls can be caused to engage respectively with the plurality of engaging recess sections.

d) The clamp releasing means comprises a ring-shaped recess formed in the clamp output member in an adjacent position to the ring-shaped tapered face, the ring-shaped recess allowing the plurality of steel balls to retreat inwards in a radial direction. When moving from the clamped state to the unclamped state, if the clamp output member is moved in the axial direction in the opposite direction to that traveled when moving to the clamped state, then the ring-shaped tapered face also travels in the same direction due to the movement of the clamp output member, and hence the plurality of steel balls, that were pushed outwards in radial directions by the ring-shaped tapered face, move back inwards and retreat respectively into the ring-shaped recess formed adjacently to the ring-shaped tapered face. Therefore, the fixing of the object to be fixed is released by means of retreating the steel balls from the engaging recess sections.

Consequently, when moving from a clamped state to an unclamped state, by causing the ring-shaped tapered face to move in the same direction as the clamp output member due to the movement of the clamp output member, the plurality of steel balls are caused to move inwards and retreat respectively into the ring-shaped recess formed adjacently to the ring-shaped tapered face, and hence the plurality of steel balls are separated respectively from the plurality of engaging recess sections and the fixing of the object to be fixed is released.

e) The clamp operating means comprises plural disc springs for urging the clamp output member in the direction of the center axis thereof. Therefore, when moving to the clamped state, the clamp output member is driven in the axial direction by the disc springs, whereby the plurality of steel balls are moved in radial directions and can be caused to engage respectively with the plurality of engaging recess sections.

f) The clamp releasing means comprises a hydraulic cylinder capable of driving the clamp output member in the direction of the center axis thereof, against the elastic urging force of the disc springs. Therefore, when moving from a clamped state to an unclamped state, the clamp output member is driven by the hydraulic cylinder in a direction opposite to that traveled when moving the clamped state, against the elastic urging force of the disc springs, and hence the plurality of steel balls can be separated respectively from the plurality of engaging recess sections.

MOST PREFERRED EMBODIMENT OF THE INVENTION

Next, a most preferred embodiment of the present invention will be described.

This embodiment is an example of case where the present invention is applied to a clamp device for fixing a work pallet for detachably installing a workpiece to be machined, to a base member fixed on the table of a machine tool.

Figure 1:
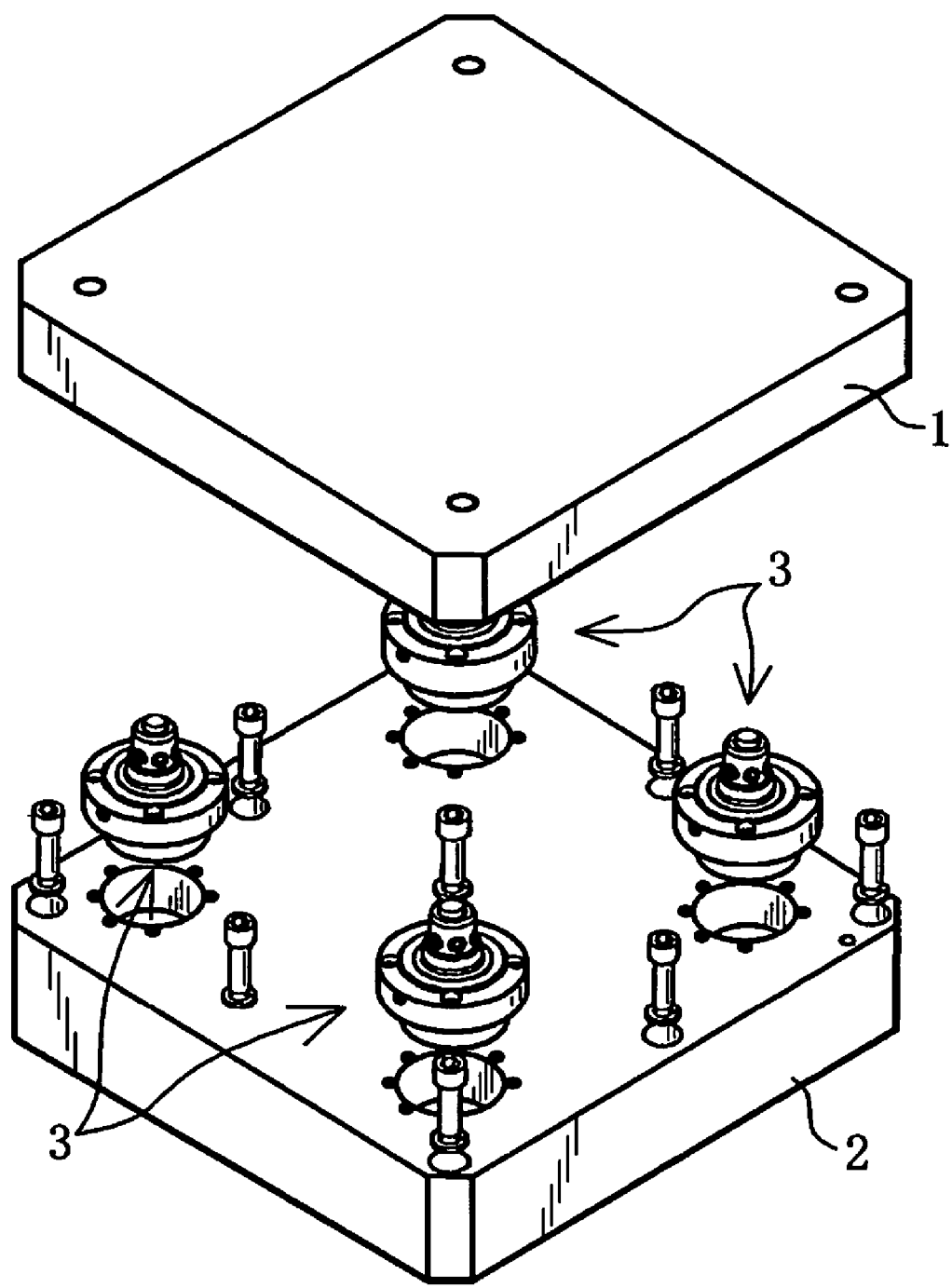
FIG. 1 is a disassembled perspective view of the general composition of a work pallet, base member and clamp device relating to an embodiment of the present invention.

As shown in FIG. 1, the work pallet 1 which is to be fixed to the base member 2 by means of four clamp devices 3. These four clamp devices 3 position the work pallet 1 in the horizontal direction and the vertical direction, with respect to the base member 2, and fix the work pallet 1 to the base member 2.

The work pallet 1 has a thick plate shape which is approximately square in plan view, and the base member 2 also has a similar square, thick plate shape. The base member 2 may be constituted by the actual table of the machine tool. The four clamp devices 3 are disposed respectively in the four corners of the square shape of the work pallet 1 and the base member 2.

Next, the clamp device 3 will be described. Here, the four clamp devices 3 each have a similar structure, and therefore only one of the clamp devices 3 shall be described below.

Figure 2:
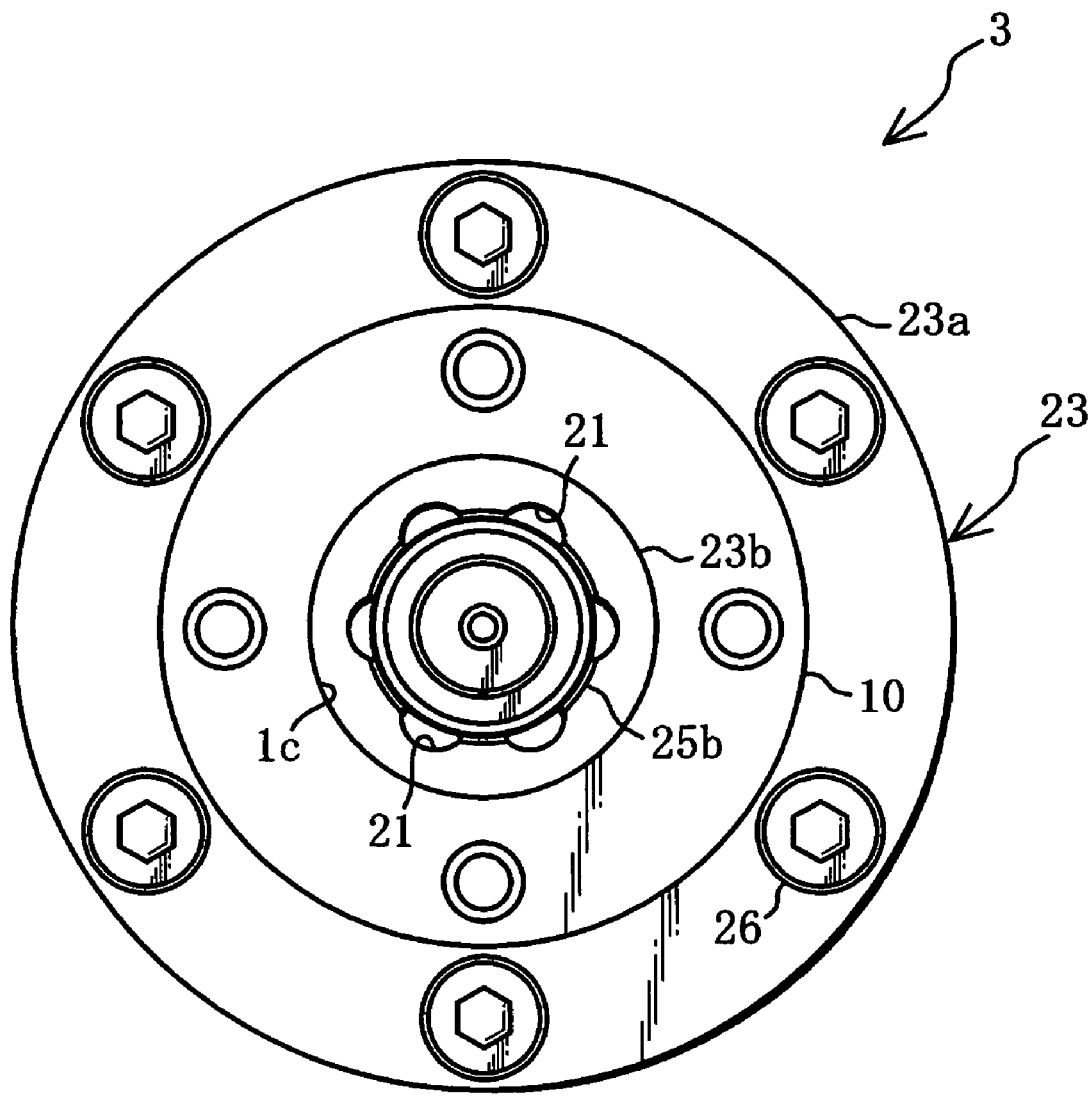
FIG. 2 is a plan view of a clamp device.
Figure 3:
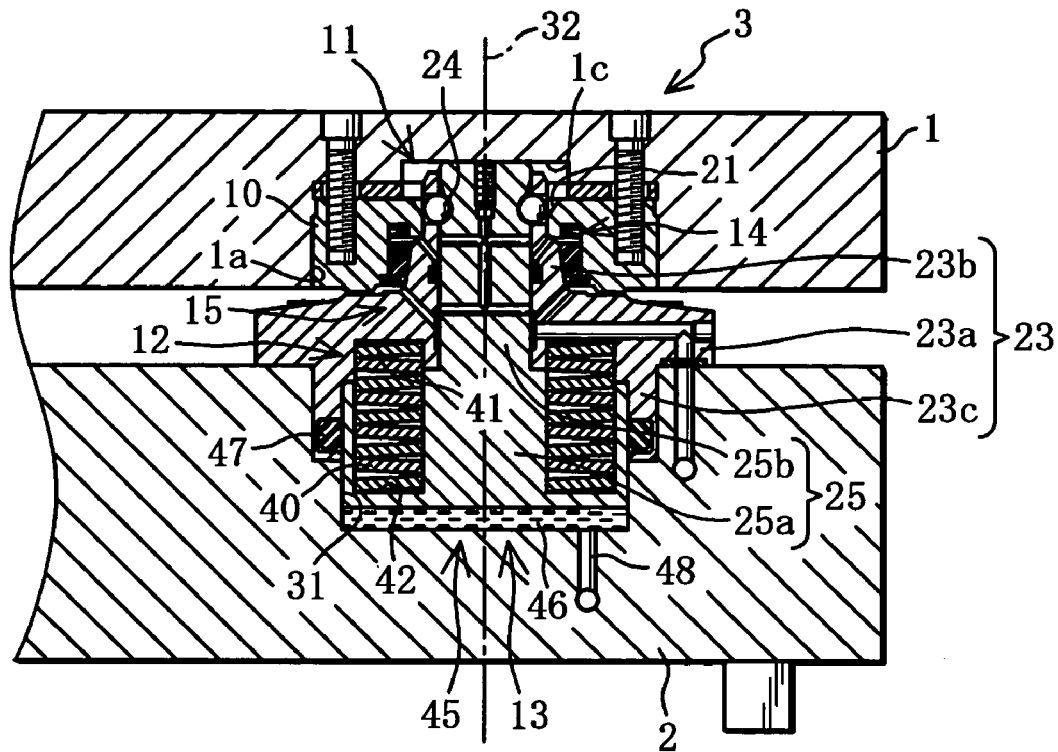
FIG. 3 is a vertically cross-sectional view of the clamp device (in an unclamped state)
Figure 4:
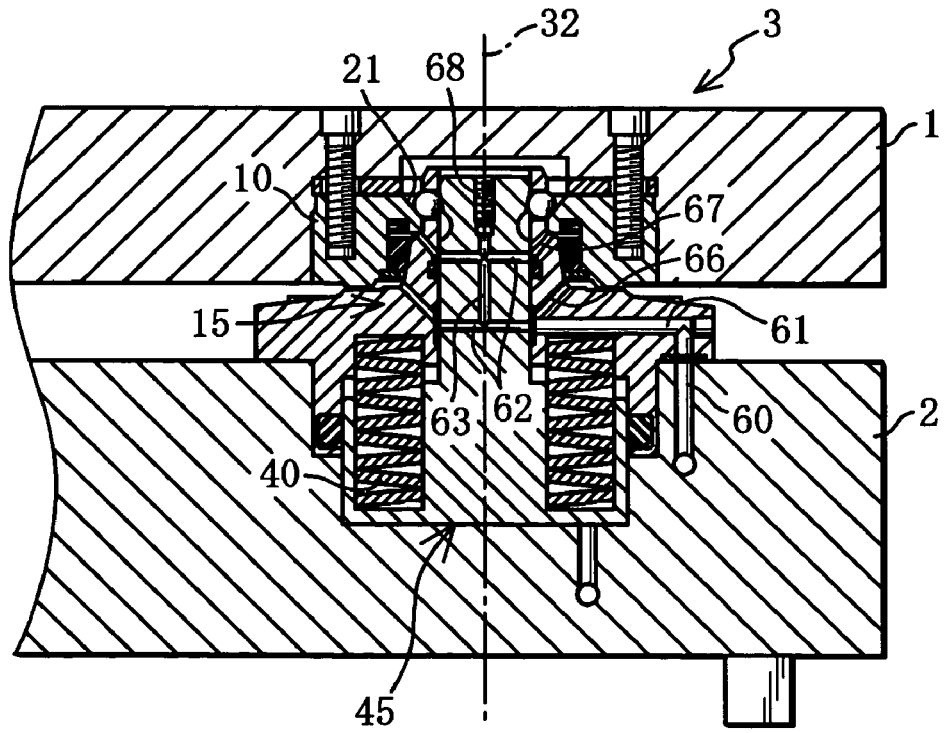
FIG. 4 is a vertically cross-sectional view of the clamp device (in a clamped state)

As shown in FIG. 2 to FIG. 4, the clamp device 3 has a ring-shaped bush 10 fixed to the work pallet 1, a clamp mechanism 11 that fixes the bush 10 to the base member 2, clamp operating means 12 for operating the clamp mechanism 11 in a clamping direction, clamp releasing means 13 for operating the clamp mechanism 11 in a clamp releasing direction, a positioning mechanism 14 capable of positioning the work pallet 1 with respect to the base member 2 in the horizontal direction and the vertical direction, and an air supply mechanism 15 for supplying pressurized air for removing dust, and the like.

As shown in FIG. 2–FIG. 8, the bush 10 is accommodated internally inside an accommodating hole 1a formed in the lower portion of the work pallet 1, and is fixed to the work pallet 1 by four bolts 1b, for example, in a state where the height thereof has been adjusted by interposing a height-adjusting shim plate 20. A recess hole 1c connecting to the central portion of the upper end of the accommodating hole 1a is also formed in the work pallet 1.

Figure 7:
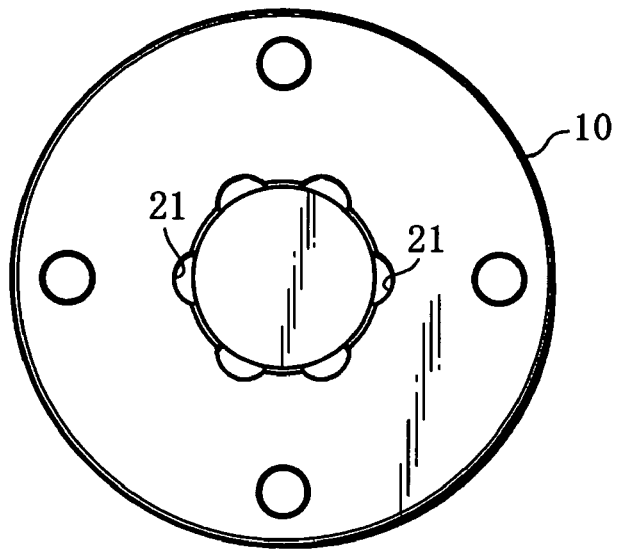
FIG. 7 is a plan view of a bush.
Figure 8:
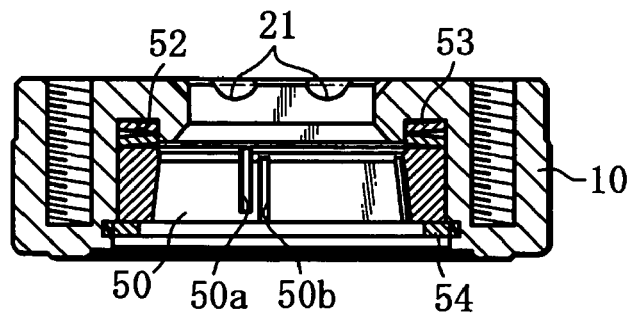
FIG. 8 is a vertically cross-sectional view of the bush.
Figure 9:
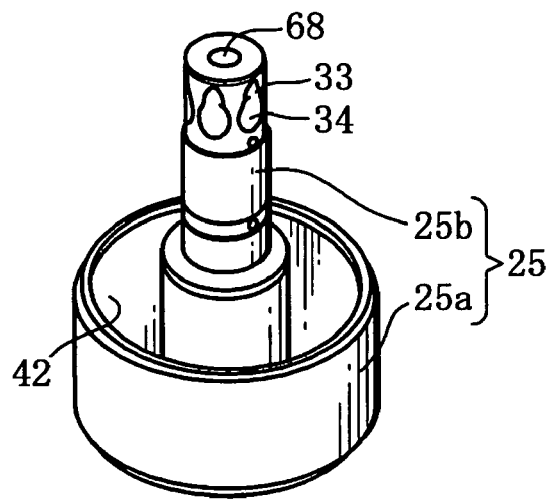
FIG. 9 is a perspective view of a piston member.

As shown in FIG. 7 and FIG. 8, six partial sphere-shaped engaging recess sections 21, for example, disposed in a ring shape, are formed in the upper end portion of the bush 10. As described hereinafter, a plurality of steel balls 24 of the clamp mechanism 11 engage with these engaging recess sections 21, thereby pulling the bush 10 towards the base member 2 and fixing same in position.

As shown in FIG. 2 to FIG. 6, the clamp mechanism 11 comprises a holding body 23 having a tubular holding section 23b, six steel balls 24 held movably in the radial direction on this holding section 23b in positions corresponding to the six engaging recess sections 21, and a piston member 25 (clamp output member) which is inserted movably into an axle hole 28 in the holding section 23b, the clamp mechanism 11 being constituted in such a manner that it cause the six steel balls 24 to engage respectively with the six engaging recess sections 21.

The holding body 23 comprises a large diameter section 23a in the middle portion in the vertical direction thereof, a holding section 23b, capable of passing through the bush 10, extending upwards from this large diameter section 23a, and a ring-shaped section 23c which projects outwards from the lower end of the large diameter section 23a. The holding body 23 is fixed to the base member 2 by six bolts 26 passing through the large diameter section 23a, in a state where the ring-shaped section 23c is fitted inside the accommodating hole 2a of the base member 2.

A ring-shaped receiving face 27 for receiving the bush 10 and determining the position of the work pallet 1 in the vertical direction is formed on the upper face of the large diameter section 23a.

An axle hole 28 through which the rod section 25b of the piston member 25 is passed is formed in the holding section 23. Six through holes 29 which pierce the holding section 23b in a radial direction are provided in the upper half of the holding section 23b. A ring-shaped tapered face 30 which decreases in diameter in the upward direction is formed on the outer circumference of the lower half of the holding section 23b. A cylinder hole 31 is also formed in the ring-shaped section 23c and the base member 2.

Six steel balls 24 are held movably in the radial direction in the six through holes 29 of the holding section 23b. As described hereinafter, when the device is moved to a clamped state, the six steel balls 24 move outwards in the radial direction and respectively engage with the engaging recess sections 21, and when the device is moved to an unclamped state, the six steel balls 24 move inwards in the radial direction and respectively retreat into recess sections 34 in the piston member 25.

As shown in FIG. 3 to FIG. 6, and FIG. 9, the piston member 25 comprises an integrally formed piston section 25a and rod section 25b. The piston section 25a fits internally in a sidable fashion into the cylinder hole 31. The rod section 25b is inserted into the axle hole 28, movably in the axial direction 32 thereof, and a dust seal 33 for preventing infiltration of foreign matter, such as cuttings, swarf, or the like, into the interior of the holding body 23, is installed between the rod section 25b and the axle hole 28. Six groove-like inclined sections 33 which are inclined at approximately 30° with respect to the center axis 32 in such a manner that they incline towards the center axis 32 in the downward direction are formed, in the circumferential side portions of the upper end of the rod section 25b, and six hemispherically-shaped recess sections 34, respectively adjacent to the inclined sections 33, are formed below the six inclined sections 33.

The clamp operating means 12 serves to cause the piston member 25 to move downwards, thereby causing the six steel balls 24 to engage respectively with the six engaging recess sections 21, and this clamp operating means 12 comprises a plurality of disc springs 40 which impel the piston member 25 in a downward direction, and the six inclined sections 33 formed in the piston member 25 which cause the six steel balls 24 to move outwards in radial directions.

The plurality of disc springs 40 are disposed in a compressed state inside the ring-shaped section 23c and the piston section 25a, a portion of the disc springs 40 being accommodated in a ring-shaped spring accommodating section 41 formed in the large-diameter section 23a, and the remainder of the disc springs 40 being accommodated in a ring-shaped spring accommodating section 42 formed in the piston section 25a. These disc springs 40 generate a clamping force which impels the piston member 25 downwards, strongly.

Figure 6:
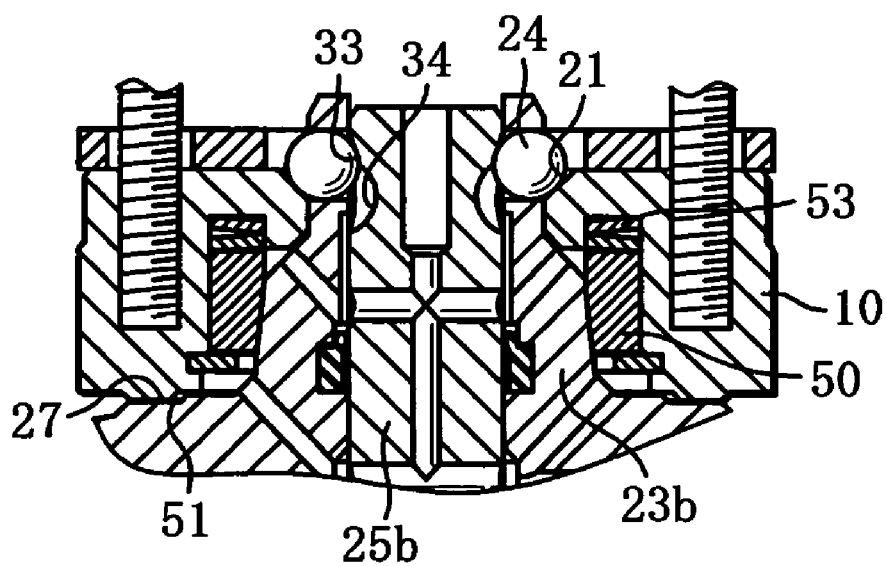
FIG. 6 is an enlarged partial view of FIG. 4.

When the device is drived to a clamped state, the piston member 25 is driven downwards by the disc springs 40, and in accordance with this downward movement of the piston member 25, the six inclined sections 33 respectively abut against the six steel balls 24, thereby pushing the six steel balls 24 outwards in radial directions, and hence the steel balls 24 move outwards in radial directions and respectively engage with the six engaging recess sections 21, as illustrated in FIG. 4 and FIG. 6.

The clamp releasing means 13 serves to cause the piston member 25 to move upwards, thereby allowing the six steel balls to retreat respectively from the six engaging recess sections 21, and this clamp releasing means 13 comprises a hydraulic cylinder 45 capable of driving the piston member 25 upwards against the elastic urging force of the disc springs 40, and the six recess sections 34 into which the six steel balls 24 can retreat respectively, in an inward radial direction.

The hydraulic cylinder 45 comprises the cylinder hole 31, the piston section 25a, and an oil chamber 46 for generating a clamp releasing force for driving the piston member 25 upwards, and the like. As described above, the piston section 25a fits internally in a slidable fashion into the cylinder hole 31, and a sealing member 47 seals between the cylinder hole 31 and the piston section 25a. The oil chamber 46 is provided inside the base member 2 to the lower side of the piston member 25a, and hydraulic pressure can be supplied to, and discharged from, this oil chamber 46 by means of an oil passage 48 formed in the base member 2 and connecting to an external hydraulic pressure supply device.

When driving the device from a clamped state to an unclamped state, hydraulic pressure is supplied to the oil chamber 46, and the piston member 25 is driven upwards against the elastic urging force of the disc springs 40, by means of the clamp releasing force generated by this oil chamber 46. In accordance with the upward movement of the piston member 25, the six inclined sections 33 also move upwards, and with this upward movement of the six inclined sections 33, the six steel balls 24 move towards the inside, whereby the steel balls 24 respectively retreat into the six recess sections 34, as illustrated in FIG. 3 and FIG. 5, thus separating the steel balls 24 from the engaging recess sections 21.

Figure 5:
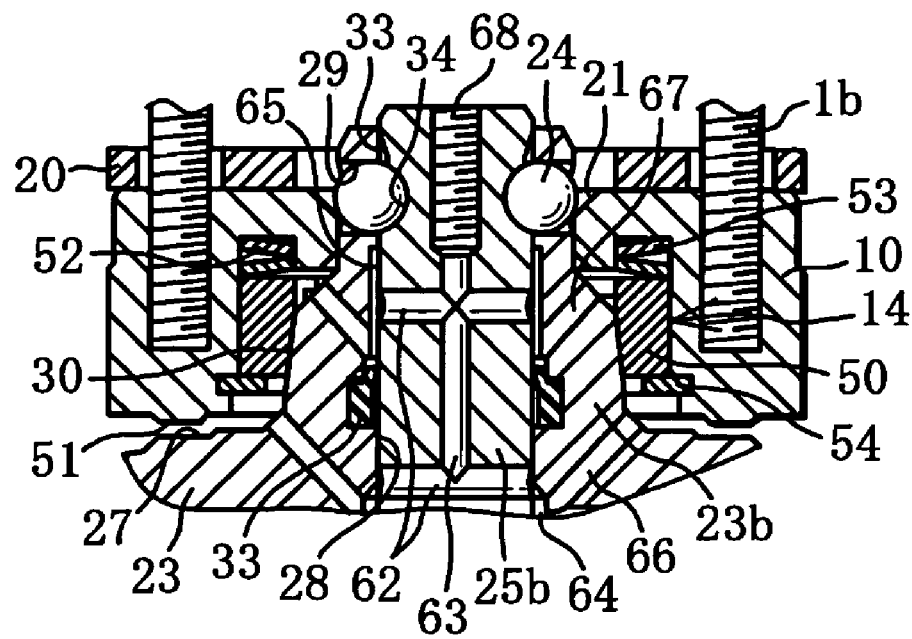
FIG. 5 is an enlarged partial view of FIG. 3.

As shown in FIG. 5 and FIG. 6, the positioning mechanism 14 comprises the receiving face 27 for determining the position of the work pallet 1 in the vertical direction, and the ring-shaped tapered face 30, and a tapered collet 50 provided on the bush 10, for determining the position of the work pallet 1 in the horizontal direction. An abutting face 51 for abutting with the receiving face 27 is formed on the lower end of the bush 10, and in a clamped state, this abutting face 51 abuts against the receiving face 27, thereby positioning the position of the work pallet 1 in the vertical direction to a high degree of accuracy.

Figure 10:
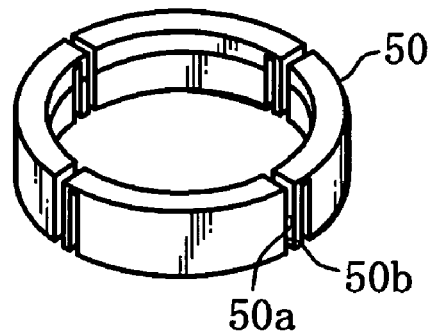
FIG. 10 is a perspective view of a tapered collet.
Figure 11:
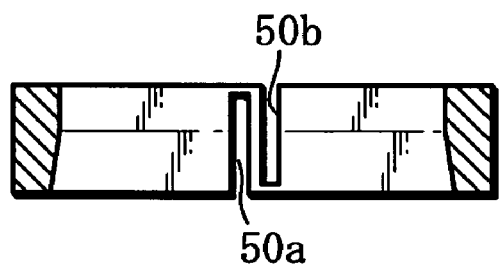
FIG. 11 is a vertically cross-sectional view of the tapered collet.

A tapered collet 50 capable of deforming elastically in the outward radial direction is installed slidably in the vertical direction on the side part of the inner circumference of the bush 10. The outer circumference of the tapered collet 50 is formed with a round cylindrical face, and the inner circumference of the tapered collet 50 is formed with a tapered face that expands in diameter in the downward direction and is capable of engaging hermetically with the ring-shaped tapered face 30. As shown in FIG. 10 and FIG. 11, slits 50a, 50b for promoting the elastic deformation of the tapered collet 50 are formed in four equidistant positions in the circumferential direction of the tapered collet 50.

A ring-shaped groove 52 is formed above the tapered collet 50 in the side part of the inner circumference of the bush 10, and a disc springs 53 which elastically impels the tapered collet 50 in a downward direction is provided in this ring-shaped groove 52. A holding ring 54 for preventing removal of the tapered collet 50 is installed below the tapered collet 50.

In a state where the tapered collet 50 is fitted externally over the ring-shaped tapered face 30, when the six steel balls 24 engage respectively with the six engaging recess sections 21, and the bush 10 is drawn towards the base member 2, the tapered collet 50 is urged downwards by the disc springs 53, and hence the tapered collet 50 engages hermetically with the ring-shaped tapered face 30 and positions the work pallet 1 in the horizontal direction, with a high degree of accuracy. Simultaneously, the abutting face 51 of the bush abuts against the receiving face 27, and the work pallet 1 is thereby positioned in the vertical direction also, with a high degree of accuracy.

As shown in FIG. 3 and FIG. 5, the air supply mechanism 15 comprises an air passage 60 formed in the base member 2 and connected to an external compressed air supply device (not illustrated), an air passage 61 formed in the holding body 23, air passages 62, 63 formed in the rod sections 25b, ring-shaped grooves 64, 65, blow holes 66, 67. Four sets of blow holes 66, 67 are formed respectively in a radiating fashion, for example. The upper end of the air passage 63 is sealed by a plug member 68. In this air supply mechanism 15, the compressed air supplied by a compressed air supply device is ejected from the blow holes 66 via the air passage 62 and the ring-shaped groove 64, thereby blowing air onto the vicinity of the receiving face 27 and the abutting face 51, in addition to which, the compressed air is also ejected from the blow holes 67 via the air passages 62, 63, and the ring-shaped groove 65, thereby blowing air onto the vicinity of the ring-shaped tapered face 30 and the tapered collet 50.

Next, the action of the clamp device 3 will be described.

As shown in FIG. 3 and FIG. 5, before the work pallet 1 is conveyed to the base member 2 and installed thereon, hydraulic pressure is supplied to the oil chamber 46, thereby maintaining an unclamped state. In this case, the clamp releasing force generated by the hydraulic cylinder 45 presses the piston member 25 upwards against the clamping force of the disc springs 40, and the upper end of the rod section 25*b* abuts against the upper end of the recess hole 1*c*. Here, the six steel balls 24 are in a state where they have moved in an inward radial direction and are respectively retreated into the six recess sections 34.

Thereupon, from this state, after the work pallet 1 has been set on the base member 2, then if the hydraulic pressure in the oil chamber 46 is discharged, as illustrated in FIG. 4 and FIG. 6, the clamping force created by the disc springs 40 will act on the piston member 25 and push the piston member 25 downwards. In this case, the six inclined sections 33 formed in the piston member 25 also move downwards, thereby pushing the six steel balls 24 outwards respectively in radial directions, and hence the six steel balls 24 move outwards and engage respectively with the six engaging recess sections 21.

The clamping force is therefore transmitted to the bush 10 by the steel balls 24, and hence the bush 10 is pulled towards the base member 2. Simultaneously, the tapered collet 50 engages hermetically with the ring-shaped tapered face 30 of the holding section 23*b*, thereby positioning the work pallet 1 in the horizontal direction, and the abutting face 51 of the bush 10 abuts against the receiving face 27, thereby positioning the work pallet 1 in the vertical direction. Consequently, the work pallet 1 is fixed to the base member 2 in a highly accurately positioned state in both the horizontal direction and the vertical direction.

Next, if hydraulic pressure is supplied to the oil chamber 46, when the device is in a clamped state, then the piston member 25 is driven upwards against the elastic urging force of the disc springs 40, by the clamp releasing force generated by the oil chamber 46. Accordingly, the inclined sections 33 also move upwards, the six steel balls 24 move in an inward radial direction, and hence the six steel balls 24 are respectively separated from the six engaging recess sections 21 and retreat respectively into the recess sections 34, whereby the fixing of the work pallet 1 is released.

According to the clamp device 3 described above, the following advantages are obtained.

1) Since the work pallet 1 is clamped by means of the six steel balls 24 engaging respectively with the six engaging recess sections 21 when in the clamped state, then the contact surface area between the bush 10 and the steel balls 24 becomes relatively large and hence the steel balls 24 will not leave contact marks on the bush 10, and the position of engagement between the steel balls 24 and the bush 10 will remain unchanged, even after repeated use of the work pallet 1, whereby the clamping force will always act evenly on the bush 10 and therefore it will be possible to sustain a stable clamped state. Moreover, even if a large clamping force is required, since the contact surface area between the steel balls 24 and the bush 10 is relatively large, there is no need to increase the size of the steel balls 24 or to increase the number of steel balls, in order to increase this contact surface area, and hence the clamp device 3 can be made compact in size.

2) Since the tapered collet 50 engages hermetically with the ring-shaped tapered face 30 of the holding section 23*b*, in addition to which, the abutting face 51 of the bush 10 abuts against the receiving face 27, then it is possible to position the work pallet 1 with respect to the base member 2, to a high degree of accuracy, in both the horizontal direction and the vertical direction. Moreover, since slits 50*a*, 50*b* for promoting elastic deformation are formed in the tapered collet 50, then it is possible for the tapered collet 50 to contact tightly and reliably with the ring-shaped tapered face 30 when in the clamped state, and hence the work pallet 1 can be positioned in position in the horizontal direction with an even higher degree of accuracy.

Next, various modifications based on the aforementioned embodiment will be described. Elements that are similar to those of the aforementioned embodiment are labeled with the same reference numerals, and description thereof is omitted as appropriate.

Figure 12:
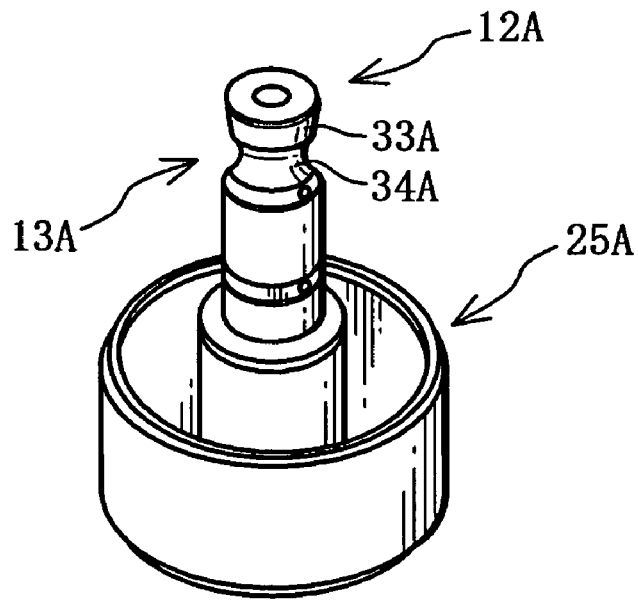
FIG. 12 is a perspective view of a piston member according to a modification.

A) As shown in FIG. 12, the clamp operating means 12A comprises a ring-shaped tapered face 33A formed in a piston member 25A which causes the plurality of steel balls 24 to move outwards in radial directions. On the other hand, the clamp releasing means 13A comprises a ring-shaped recess 34A formed in the piston member 25A adjacently to the lower side of the ring-shaped tapered face 33A, into which the plurality of steel balls 25 can retreat, in an inward radial direction. The action and advantages of this clamp device are virtually the same as those of the foregoing embodiment, and therefore description thereof is omitted here.

B) The positioning mechanism 14 may be omitted. For example, positioning mechanisms of a variety of other structures to that of the clamp device 3 may be provided between the work pallet 1 and the base member 2, in such a manner that the work pallet 1 is positioned with respect to the base member 2.

C) The number of steel balls 24 is not limited to six, and the number thereof may be selected variously, in accordance with the size of the clamp device 3, and the magnitude of the camping force thereof, and the like.

D) The present invention may be applied to a clamp device for fixing a die as an object to be fixed. The action and advantages in this case are the same as those of the foregoing embodiment, and therefore description thereof is omitted here.

The present invention is not limited to the embodiments described above, and a person skilled in the art may make various modifications to the foregoing embodiment, within a scope that does not deviate from the essence of the present invention, all such modifications being encompassed by the present invention.

INDUSTRIAL APPLICABILITY

The clamp device according to the present invention may be applied to a clamp device for fixing a work pallet for installing a workpiece to be machined, a clamp device for fixing a die for a pressing process, or a clamp device for fixing a die for extrusion molding, or the like.

The invention claimed is:

1. A clamp device for fixing an object to be fixed to a base body, the object being either a work pallet for installing a workpiece to be machined, or a die, said clamp device comprising:

a ring-shaped bush fixed to the abject to be fixed and provided with a plurality of partial sphere-shaped engaging recess sections, said recess sections being circumferentially disposed about said bush in a ring shape with substantially equal circumferential spacing between each of said recess sections;

a clamp mechanism comprising a holding body having a tubular holding section capable of being inserted into said bush, a plurality of steel balls held movably in the radial direction in the holding section so as to face said plurality of engaging recess sections, and a clamp output member inserted movably into an axle hole of the holding section, the plurality of steel balls being capable of engaging respectively with the plurality of engaging recess sections;

clamp operating means for moving said clamp output member in the direction of the center axis thereof, thereby causing the plurality of steel balls to engage respectively with the plurality of engaging recess sections; and clamp releasing means for moving said clamp output member in the direction of the center axis thereof, thereby allowing the plurality of steel balls to retreat from the plurality of engaging recess sections.

2. The clamp device according to claim 1, wherein said clamp operating means has a plurality of inclined sections formed in the clamp output member and inclined at a given angle with respect to the direction of the center axis, these inclined sections moving the plurality of steel balls respectively outwards in a radial direction.

3. The clamp device according to claim 2, wherein said clamp releasing means comprises a plurality of hemispherically-shaped recess sections formed in the clamp output member respectively adjacent to said inclined sections, said plurality of recess sections allowing the plurality of steel balls respectively to retreat inwards in a radial direction.

4. The clamp device according to claim 1 wherein said clamp operating means comprises a ring-shaped tapered face formed in the clamp output member, said ring-shaped tapered face allowing the plurality of steel balls to move outwards in a radial direction.

5. The clamp device according to claim 4, wherein said clamp releasing means comprises a ring-shaped recess formed in the clamp output member adjacent to said ring-shaped tapered face, said ring-shaped recess allowing the plurality of steel balls to retreat inwards in a radial direction.

6. The clamp device according to any one of claims 1 to 5, wherein said clamp operating means comprises plural disc springs for urging said clamp output member in the direction of the center axis thereof.

7. clamp device according to claim 6, wherein said clamp releasing means comprises a hydraulic cylinder capable of driving said clamp output member in the direction of the center axis thereof, against the elastic urging force of said disc springs.

* * * * *